(12) United States Patent
Khodorkovsky et al.

(10) Patent No.: US 11,782,494 B2
(45) Date of Patent: Oct. 10, 2023

(54) METHOD AND APPARATUS FOR POWER MANAGEMENT OF A GRAPHICS PROCESSING CORE IN A VIRTUAL ENVIRONMENT

(71) Applicants: Advanced Micro Devices, Inc., Santa Clara, CA (US); ATI Technologies ULC, Markham (CA)

(72) Inventors: Oleksandr Khodorkovsky, Toronto (CA); Stephen D. Presant, San Jose, CA (US)

(73) Assignees: ADVANCED MICRO DEVICES, INC., Santa Clara, CA (US); ATI TECHNOLOGIES ULC, Markham (CA)

( * ) Notice: Subject to any disclaimer, the term of this patent is extended or adjusted under 35 U.S.C. 154(b) by 151 days.

(21) Appl. No.: 16/120,784

(22) Filed: Sep. 4, 2018

(65) Prior Publication Data

US 2018/0373306 A1    Dec. 27, 2018

Related U.S. Application Data

(62) Division of application No. 13/325,846, filed on Dec. 14, 2011, now Pat. No. 10,095,295.

(51) Int. Cl.
*G06F 1/3206* (2019.01)
*G06F 1/324* (2019.01)

(52) U.S. Cl.
CPC ............ *G06F 1/3206* (2013.01); *G06F 1/324* (2013.01); *Y02D 10/00* (2018.01)

(58) Field of Classification Search
CPC ....... G06F 1/3203–3296; G06F 1/3206; G06F 1/324; Y02D 10/00
See application file for complete search history.

(56) References Cited

U.S. PATENT DOCUMENTS

| | | | |
|---|---|---|---|
| 6,408,393 B1 | 6/2002 | Imada | |
| 7,191,440 B2 | 3/2007 | Cota-Robles et al. | |
| 7,562,245 B1 * | 7/2009 | Cai | G06F 1/3203 713/300 |
| 7,624,287 B2 | 11/2009 | Khodorkovsky et al. | |

(Continued)

FOREIGN PATENT DOCUMENTS

EP    1134656 A1 *  9/2001   ........... G06F 1/3203

OTHER PUBLICATIONS

GViM: GPU-accelerated Virtual Machines Vishakha Gupta, Ada Gavrilovska, Karsten Schwan, Harshvardhan Kharche, Niraj Tolia, Vanish Talwar, Parthasarathy Ranganathan (Year: 2009).*

(Continued)

*Primary Examiner* — Emerson C Puente
*Assistant Examiner* — Paul V Mills (57) ABSTRACT

A method and apparatus controls power management of a graphics processing core when multiple virtual machines are allocated to the graphics processing core on a much finer-grain level than conventional systems. In one example, the method and apparatus processes a plurality of virtual machine power control setting requests to determine a power control request for a power management unit of a graphics processing core. The method and apparatus then controls power levels of the graphics processing core with the power management unit based on the determined power control request.

14 Claims, 5 Drawing Sheets

(56) References Cited

U.S. PATENT DOCUMENTS

| | | | |
|---|---|---|---|
| 7,734,941 B2 | 6/2010 | Khodorkovsky et al. | |
| 8,924,752 B1* | 12/2014 | Law | G06F 1/3206 |
| | | | 713/322 |
| 8,938,723 B1* | 1/2015 | Tormasov | G06F 8/52 |
| | | | 717/136 |
| 10,095,295 B2 | 10/2018 | Khodorkovsky et al. | |
| 2002/0013802 A1 | 1/2002 | Mori et al. | |
| 2005/0039180 A1 | 2/2005 | Fultheim et al. | |
| 2005/0132362 A1 | 6/2005 | Knauerhase et al. | |
| 2005/0195181 A1 | 9/2005 | Khodorkovsky | |
| 2005/0268078 A1* | 12/2005 | Zimmer | G06F 9/5094 |
| | | | 713/1 |
| 2005/0268141 A1* | 12/2005 | Alben | G06F 1/3296 |
| | | | 713/500 |
| 2006/0146057 A1 | 7/2006 | Blythe | |
| 2006/0161793 A1 | 7/2006 | Orr | |
| 2006/0212247 A1* | 9/2006 | Shimoyama | G06F 1/324 |
| | | | 702/89 |
| 2007/0008324 A1* | 1/2007 | Green | G06F 9/45558 |
| | | | 345/501 |
| 2007/0206018 A1 | 9/2007 | Bajic et al. | |
| 2008/0058999 A1 | 3/2008 | Khodorkovsky et al. | |
| 2008/0059813 A1 | 3/2008 | Khodorkovsky et al. | |
| 2008/0276235 A1 | 11/2008 | Knauerhase et al. | |
| 2008/0301474 A1* | 12/2008 | Bussa | G06F 1/3203 |
| | | | 713/300 |
| 2009/0201082 A1* | 8/2009 | Smith | G06F 1/3203 |
| | | | 327/544 |
| 2009/0102849 A1 | 9/2009 | Khodorkovsky et al. | |
| 2009/0320031 A1* | 12/2009 | Song | G06F 9/5094 |
| | | | 718/102 |
| 2010/0162023 A1* | 6/2010 | Rotem | G06F 1/3203 |
| | | | 713/340 |
| 2010/0162242 A1* | 6/2010 | Grouzdev | G06F 9/45558 |
| | | | 718/1 |
| 2010/0192149 A1 | 7/2010 | Lathrop et al. | |
| 2010/0218029 A1* | 8/2010 | Floyd | G06F 1/324 |
| | | | 713/601 |
| 2010/0262722 A1* | 10/2010 | Vauthier | G06F 9/45558 |
| | | | 710/8 |
| 2010/0283791 A1 | 11/2010 | Lin | |
| 2011/0047350 A1* | 2/2011 | Geissler | G06F 9/5061 |
| | | | 712/28 |
| 2011/0057936 A1 | 3/2011 | Gotwalt et al. | |
| 2011/0060924 A1 | 3/2011 | Khodorkovsky | |
| 2011/0060928 A1 | 3/2011 | Khodorkovsky et al. | |
| 2011/0102443 A1* | 5/2011 | Dror | G06T 1/20 |
| | | | 345/522 |
| 2011/0148923 A1 | 6/2011 | Sadowski et al. | |
| 2011/0154322 A1* | 6/2011 | Nayar | G06F 9/5077 |
| | | | 718/1 |
| 2011/0161981 A1* | 6/2011 | Van De Ven | G06F 9/4843 |
| | | | 718/107 |
| 2011/0213997 A1 | 9/2011 | Kansal et al. | |
| 2011/0264934 A1 | 10/2011 | Branover et al. | |
| 2011/0268425 A1 | 11/2011 | Glen | |
| 2012/0102348 A1* | 4/2012 | Muralidhar | G06F 1/3287 |
| | | | 713/323 |
| 2013/0145188 A1* | 6/2013 | Gloekler | G06F 1/324 |
| | | | 713/322 |
| 2013/0275737 A1* | 10/2013 | Therien | G06F 11/3672 |
| | | | 713/1 |
| 2016/0259664 A1* | 9/2016 | Guan | G06F 9/45504 |

OTHER PUBLICATIONS

Virtual Power: Coordinated Power Management in Virtualized Enterprise Systems Ripal Nathuji and Karsten Schwan (Year: 2007).*

Power Gating Strategies on GPUs Po-Han Wang, Chia-Lin Yang, Yen-Ming Chen, and Yu-Jung Cheng, (Year: 2011).*

TSB: A DVS algorithm with quick response for general purpose operating systems Euiseong Seo, Seonyeong Park, Jinsoo Kim, Joonwon Lee (Year: 2007).*

Multitasking Discussion Graham Wideman Retrieved: www.grahamwideman.com/gw/tech/dataacq/multitasking.htm (Year: 2005).*

Power-efficient System Design Preeti Ranjan Panda, Aviral Shrivastava, B.V.N. Silpa, Krishnaiah Gummidipudi Chapter 3, 5, and 7 (Year: 2010).*

Time slice | Article about time slice by The Free Dictionary Retrieved: encyclopedia2.thefreedictionary.com/time+slice (Year: 2020).*

Multimedia Databases in Perspective—Chapter 11: Operating System Support Burkow T., Mullender p. 249-252, 256-257 (Year: 1997).*

Implementation of distributed software environments for dynamic power system security assessment Grzejewski, Jerzy Marek p. 34-51 (Year: 1995).*

Adaptive Virtual Machine Scheduling and Migration for Embedded Real-Time Systems Stefan Groesbrink Chapter 2 (Year: 2015).*

VisSched: An Auction based Scheduler for Vision Workloads on Heterogeneous Processors Diksha Moolchandani, Anshul Kumar, Jos'e F. Martinez, (Year: 2020).*

Koala—A Platform for OS-Level Power Management David C. Snowdon, Etienne Le Sueur, Stefan M. Petters, Gernot Heiser (Year: 2009).*

Pegasus: Coordinated Scheduling for Virtualized Accelerator-based Systems Vishakha Gupta, Karsten Schwan, Niraj Tolia (Year: 2011).*

VCUDA: GPU-Accelerated High-Performance Computing in Virtual Machines Lin Shi, Hao Chen, Jianhua Sun, and Kenli Li (Year: 2011).*

ACPI (webpage at url: https://web.archive.org/web/20111105131742/http://en.wikipedia.org/wiki/Advanced_Configuration_and_Power_Interface, dated on Nov. 5, 2011.

Stackoverflow (webpage at url: http://stackoverflow.com/questions/2777137/programmatically-limit-cpu-usage-by-any-application-on-windows-7, dated May 5, 2010.

Wiki (wayback machine archive at url: http://web.archive.org/web/20100711023011/http://en.wikipedia.org/wiki/Dynamic_rrequency_scaling, dated Jul. 11, 2010.

* cited by examiner

METHOD AND APPARATUS FOR POWER MANAGEMENT OF A GRAPHICS PROCESSING CORE IN A VIRTUAL ENVIRONMENT

CROSS-REFERENCE TO RELATED APPLICATIONS

This application is a divisional application of U.S. patent application Ser. No. 13/325,846, filed on Dec. 14, 2011, entitled METHOD AND APPARATUS FOR POWER MANAGEMENT OF A GRAPHICS PROCESSING CORE IN A VIRTUAL ENVIRONMENT, owned by instant assignee and incorporated herein by reference.

BACKGROUND OF THE DISCLOSURE

The present disclosure relates to a power management scheme for a graphics processing core operating in a virtual environment.

Virtualization relates to the creation and management of separate software environments or "virtual machines" (VMs) operating on a physical machine, or host system. The host system is logically partitioned so that the underlying hardware of the physical machine is time shared and appears to be independently operating VMs. The software running in a VM is collectively referred to as guest software. Therefore, each VM functions as a self-contained platform, running its own guest operating system (OS) and guest application software.

A hypervisor or virtual machine manager (VMM) is a software program that allows multiple VMs to share a single hardware host system. The hypervisor schedules and manages the allocation of the host hardware resources to the different VMs. The guest operating system of each VM appears to have the host's processor, memory, and other resources all to itself. The hypervisor controls the host's processor and other resources, allocating what is needed to each VM. Hypervisors typically rely on time-slicing between various VMs according to round-robin or priority-based schemes, for example, to allocate resources to the various VMs. Time slices allocated to each VM may be stored in a memory so that the hypervisor periodically switches between the VMs based on the allocated time slices.

The use of a single central processing unit (CPU) by multiple VMs is well known. For instance, one VM may be operating Microsoft Windows® and another VM may be operating Linux. Input output (I/O) devices are typically assigned to one VM at a time. A hypervisor running on the CPU manages allocation of the physical machines such as CPU and a graphics processing core to the various VMs. In conventional virtualization systems, the hypervisor allocates the graphics processing core as a physical resource to one of the VMs at a time as discussed above. This conventional system may include multiple graphics processing cores in a one-to-one relationship with the VMs. In other prior art virtualization examples, one VM controls the graphics processing core while other VMs emulate rendering functions in software. An end user can switch ownership of the graphics processing core between the multiple VMs. In another embodiment, the hypervisor may show the user a window inside another window on a display for managing ownership of the graphics processing core. The graphics processing core typically flushes out content for one VM and reproduces it with the content of the next VM.

In a non-virtual environment, a graphics driver defines the operating range settings of the graphics processing core frequencies and voltages based on factors such as display bandwidth, decoding, encoding and other requirements for current display configurations and active applications. These operating range settings are then programmed into hardware memory for use by a power management unit (PMU) of the graphics processing core.

In a virtual environment, each VM typically includes its own graphics driver that requests power management operating range settings of the graphics processing core including operating frequencies and voltages for various engines of the graphics processing core based on the operating conditions of the associated VM. However, different VMs often run different application mixes that require different graphics processing core power management operating ranges.

Therefore, there exists a need to determine appropriate processor (e.g., graphics processing core) operating ranges for various engines of the graphics processing core to satisfy the requirements of the multiple VMs using the processor (e.g., graphics processing core).

BRIEF DESCRIPTION OF THE DRAWINGS

The embodiments will be more readily understood in view of the following description when accompanied by the figures listed below, wherein.

DETAILED DESCRIPTION OF THE PREFERRED EMBODIMENTS

The present disclosure relates to a power management scheme for a graphics processing core operating in a virtual environment, and more particularly to power management for a graphics processing core being used by a plurality of different virtual machines.

Briefly, in one example, a method and apparatus processes a plurality of virtual machine power control setting requests to determine a power control request for a power management unit of a graphics processing core and controls power levels of the graphics processing core with the power management unit based on the determined power control request. In one example, the method and apparatus blends a plurality of virtual machine power control setting requests together to determine the power control request for the power management unit. In another example, the method and apparatus selects a power control setting request from one of the plurality of virtual machines as the power control request for the power management unit, such as when the selected one of the virtual machines is scheduled to use the graphics processing core for a time slice greater than a predetermined threshold time length. Therefore, the present method and apparatus advantageously determines appropriate operating ranges for various engines of the graphics processing core to satisfy the requirements of the multiple virtual machines using the graphics processing core on a much finer-grain level than conventional systems.

In an exemplary embodiment, the power management unit uses the determined power control request to controls a power level of at least one engine of the graphics processing core, such as a graphics engine, a display engine, a decoding engine, an encoding engine, for example. The determined power control request may also control turning at least one engine of the graphics processing core on and off.

The method and apparatus may compare the plurality of virtual machine power control setting requests and determine the power control request for the power management unit based on the comparison. In one example, the determined power control request is a range of operating frequencies of the graphics processing core suitable for operating each of the plurality of virtual machines. The range of operating frequencies may include maximum and minimum frequencies for suitable for operating each of the plurality of virtual machines.

In one example, the method and apparatus stores the plurality of virtual machine power control setting requests and the determined power control request in a memory electrically coupled to the power management unit. The stored virtual machine power control setting requests are linked to a unique identifier of an associated virtual machine.

For the purposes of promoting an understanding of the principles of the present disclosure, reference will now be made to the embodiments illustrated in the drawings, which are described below. The embodiments disclosed below are not intended to be exhaustive or limit the disclosure to the precise form disclosed in the following detailed description. Rather, the embodiments are chosen and described so that others skilled in the art may utilize their teachings. Therefore, no limitation of the scope of the claimed invention is thereby intended. The present invention includes any alterations and further modifications of the illustrated devices and described methods and further applications of the principles of the invention which would normally occur to one skilled in the art to which the invention relates. Corresponding reference characters indicate corresponding parts throughout the several views.

Figure 1:
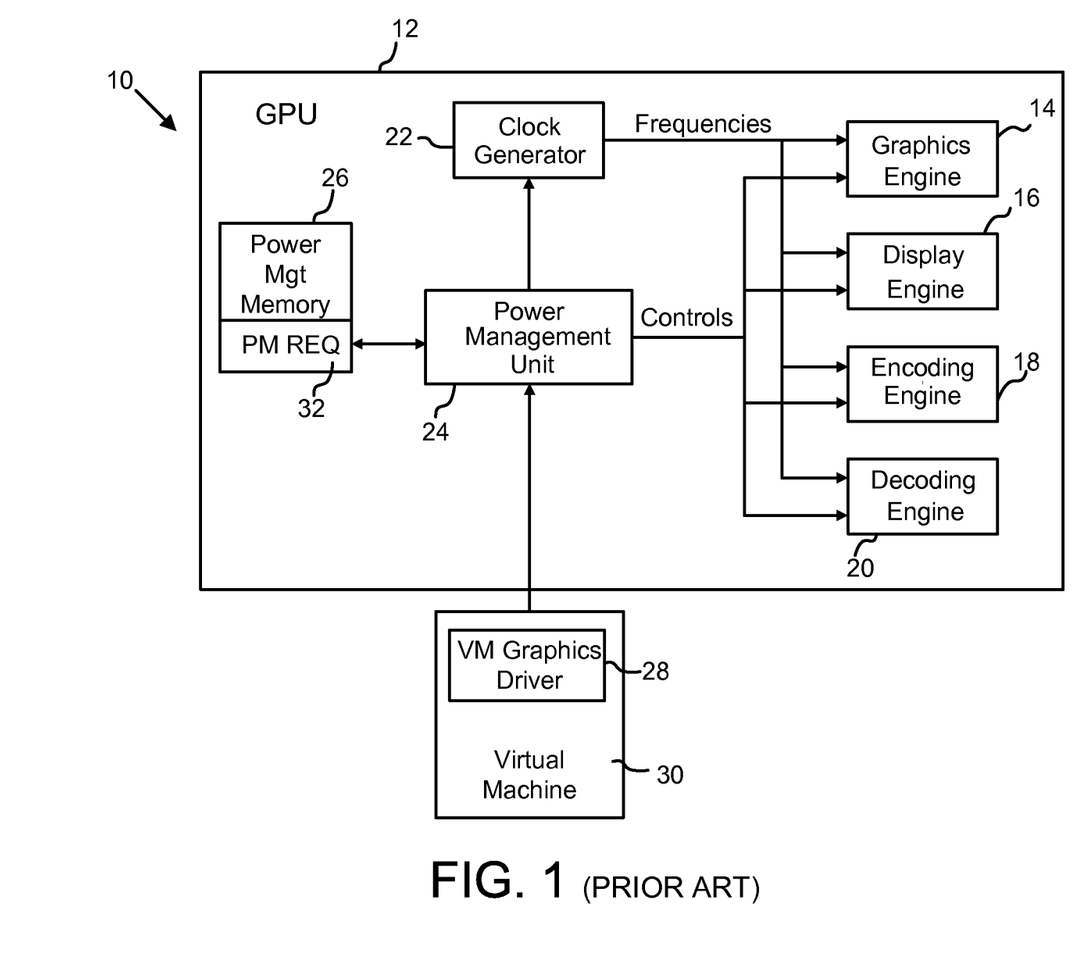
FIG. 1 is a block diagram illustrating an exemplary prior art graphics processing core operating in a virtual environment.
Figure 2:
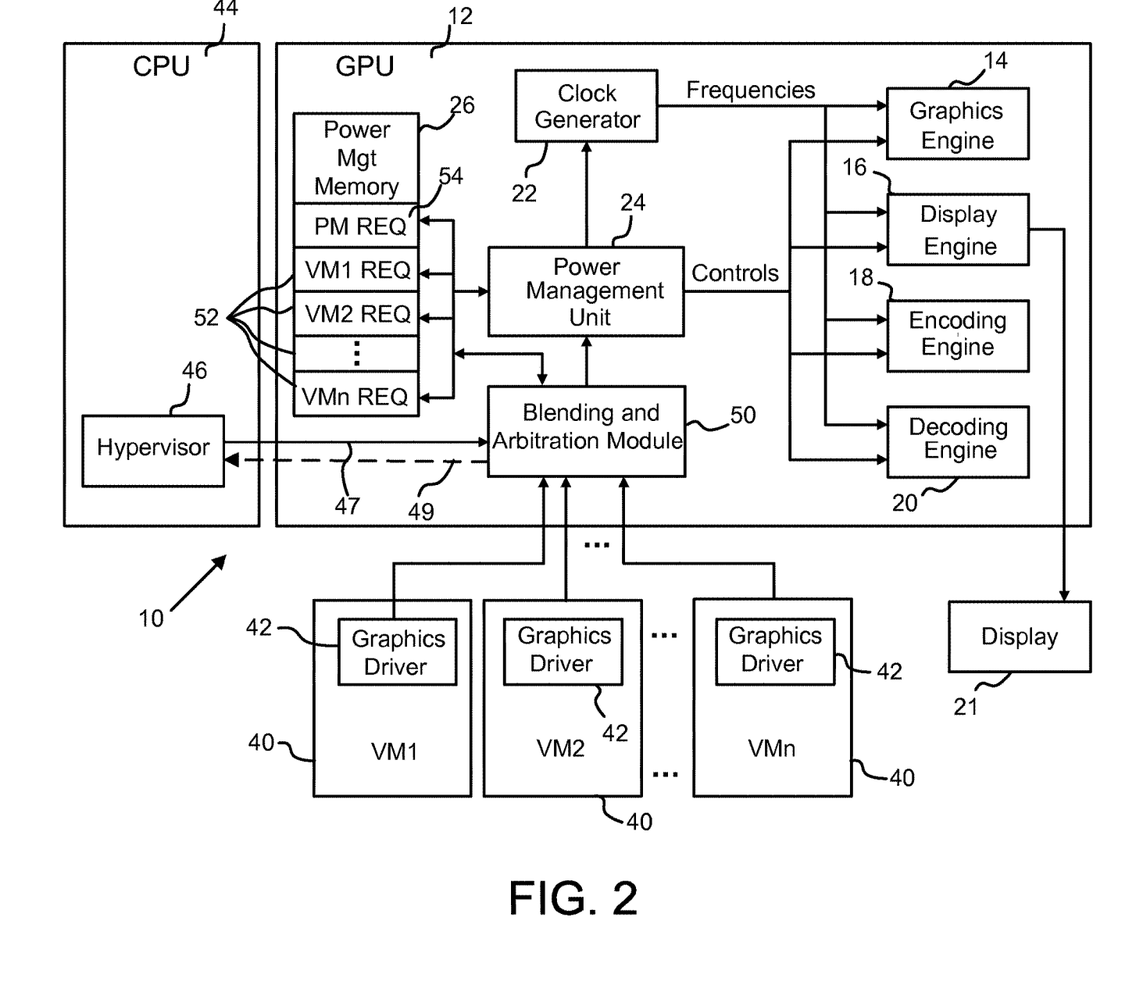
FIG. 2 is a block diagram illustrating an exemplary graphics processing core of the present disclosure operating in a virtual environment with a plurality of virtual machines sharing the same graphics processing core.

Referring now to the drawings, FIGS. 1 and 2 illustrate an exemplary integrated circuit processor system 10 which is illustratively a graphics processing core 12 having a graphics engine 14, a display engine 16, and encoding engine 18, and a decoding engine 20. The graphics processing core may also include other components such as an audio processing unit and a security unit. The graphics processing core 12 is part of a power consuming graphics subsystem. The graphics subsystem is a combination of hardware and software components used to generate two-dimensional, three-dimensional and/or multimedia graphics for display by an electronic computing device to which it is electrically connected. The graphics processing core 12 provides the hardware component of the graphics subsystem. The graphics subsystem may be implemented as a single application-specific integrated circuit (ASIC). The graphics subsystem may also be integrated directly with other circuitry of a host devise or may be a dedicated graphics card connected to a mother board of the host device via a communication link.

Host devices which may use the graphics processing core 12 may include personal computers, notebook or laptop computers, portable video game units, portable digital assistants, cellular telephones and the like. The host device optionally includes a display 21 on which the graphics generated by graphics processing core 12 are displayed.

The graphics processing core 12 affects power management scheme which is a focus of the present disclosure. Therefore, only components of the graphics processing core 12 pertaining to the power management scheme are illustrated in the drawings. Graphics engine 14, display engine 16, encoding engine 18, and decoding engine 20 are all coupled to a clock generator 22 which provides variable operating frequencies to the engines 14, 16, 18 and 20. A power management unit (PMU) 24 of the graphics processing core 12 provides control signals to each of the graphics engine 14, display engine 16, encoding engine 18, and decoding engine 20. Power management unit 24 is also coupled to the clock generator 22 and to a power management memory 26. Memory 26 may be an on-chip memory or an external memory.

Power management unit 24 sets various power states for the engines 14, 16, 18 and 20 of the graphics processing core 12. For example, the power management unit 24 may set power states including clock frequencies and voltages for the graphics engine 14, display engine 16, coding engine 18, and decoding engine 20 to a low power state, a partially active state, or a fully active high power state. In a low power state, the graphics processing core 12 and associated devices can have settings set to sub-operational levels. In a partially active state, one or more of the engines 14, 16, 18 or 20 or other circuit blocks of the graphics processing core 12 can be deactivated. For example, a graphics processing core 12 used solely for display purposes can have its graphics engine 14 and other non-display related circuit blocks in a sub-operational state. In a fully active, high power state, the graphics processing core 12 and at least one of its associated engines are fully active.

In the prior art embodiment of FIG. 1, a power management unit 24 is coupled to a graphics driver 28 of virtual machine 30. Power management unit 24 receives power control setting requests for a virtual machine 30 from graphics driver 28. Power management unit 24 then stores the virtual machine power control setting requests in memory 26 as illustrated at storage location 32. The virtual machine graphics driver 28 determines the necessary graphics processing core power settings for its associated virtual machine 30 based on the operating conditions of the virtual machine 30.

Power management unit 24 then uses the power control setting requests stored at location 32 as a power control request to control clock generator 22 and to control frequencies and voltages of the graphics engine 14, display engine 16, encoding engine 18, and decoding engine 20. In prior art systems, such as shown in FIG. 1, a single virtual machine 30 is allocated to graphics processing core 12 on a coarse basis for sufficient time periods to permit the application used by the virtual machine 30 to be completed.

In the system and method of the present disclosure, multiple virtual machines (VMs) 40 may be allocated to the graphics processing core 12 on a much finer-grain level than conventional systems. Therefore, the plurality of VMs 40 use the graphics processing core 12 substantially simultaneously as illustrated in FIG. 2. Different VMs 40 run different application mixes that require different operating frequency ranges for the various engines of the graphics processing core 12. Accordingly, there exists a need for an improved method and apparatus for determining graphics processing core power control requests when a plurality of VMs 40 share the graphics processing core 12.

The system and method of the present disclosure relates to controlling power levels of a graphics processing core 12 in a virtual environment. In an illustrated embodiment of the present disclosure shown in FIG. 2, a plurality of VMs 40, labeled as VM1, VM2, . . . , VMn, share the physical resources of the host system graphics processing core 12. Each VM 40 typically includes an associated VM graphics driver 42.

Requests for memory, hard disk, network and other hardware resources such as engines 14, 16, 18 and 20 of the graphics processing core 12 are managed by a virtual machine monitor (VMM) or hypervisor 46. The hypervisor 46 is a software layer of a central processing unit (CPU) 44 in charge of virtualization. Each of the VMs 40 includes a virtual platform running a guest operating system and one or more guest applications. Since the physical resources of the host graphics processing core 12 are shared by a plurality of VMs 40, the hypervisor 46 schedules and manages allocation of the host graphics processing core platform hardware resources for the plurality different VMs 40. The hypervisor 46 allocates necessary resources to each guest operating system to make sure that the VMs 40 do not disrupt each other.

As shown in FIG. 2, the hypervisor 46 and the plurality of graphics drivers 42 are coupled to a blending and arbitration module 50 of the graphics processing core 12. Hypervisor 46 and/or drivers 42 provide information to the blending and arbitration module 50 including, for example, virtual machines switch information, the size of time slices being used by each VM 40, a unique identifier associated with each virtual machine, and virtual machine power control settings requests (VMI REQ, VM2 REQ, . . . VMn REQ) which provide graphics processing core power management requirements for each VM 40. The VM REQ data structure may include the minimum frequency, maximum frequency, and desired frequency for each clock domain within the graphics processing core 12. The blending and arbitration module 50 stores the power control setting requests linked to the unique identifier of each virtual machine in locations 52 of power management memory 26.

The blending and arbitration module 50 then uses blending and/or arbitration algorithms to determine overall power control requests (PM REQ) for use by the power management unit 24 of the graphics processing core 12. The stored PM REQ provides a set of conditions that instruct the power management unit 24 after all the specific requirements of VMs 40 are considered. The power control requests (PM REQ) based on the blending and arbitration algorithms are stored at location 54 in memory 26, for example. The PM REQ data structure may include the minimum frequency, maximum frequency, and desired frequency and desired frequency for each clock domain within the graphics processing core 12 after the requirements of all the VMs 40 have been considered as discussed herein.

Figure 3:
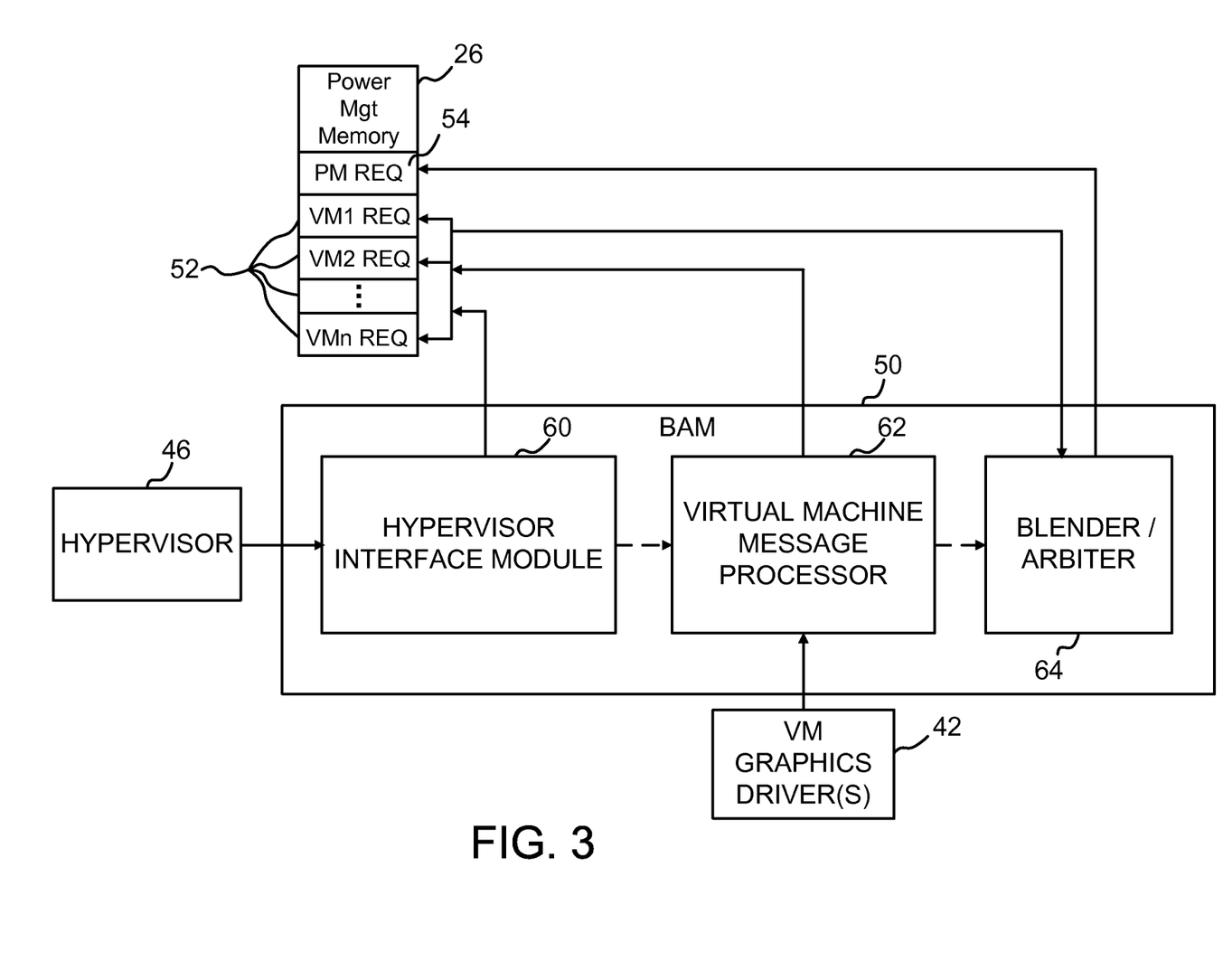
FIG. 3 is a block diagram illustrating details of a blending and arbitration module of the graphics processing core of the present disclosure.

In an illustrated embodiment, the components of the blending and arbitration module 50 shown in FIG. 3 may be firmware running on an embedded microcontroller that receives input requests and sends decisions to the power management unit 24 for clock frequency settings and status control of the graphics processing core engines 14, 16, 18 and 20. In another embodiment, the blending and arbitration module may be part of the power management unit 24.

FIG. 3 illustrates details of the blending and arbitration module 50. Blending and arbitration module 50 includes a hypervisor interface module 60 in communication with the hypervisor 46. The hypervisor interface module 60 receives information from hypervisor 42 such as virtual machine switch events, the number of active VMs 40, the unique identifier for each of the plurality of VMs 40, power management voltage and frequency control setting requests from each of the virtual machine graphics drivers 42, requests to allocate resources, storage requests, scheduling time to multiplex between virtual machines, launch and completion information, and virtual machine switch event time slice control over the graphics processing core 12. The hypervisor interface module 60 manages data states of the VMs 40 to determine a minimum clock frequency, which power states are allowed, power limits on a per graphics processing core engine basis, and voltage requirements and frequency requirements for each VM 40.

In one illustrated embodiment, communication between the hypervisor 46 and the blending and arbitration module 50 is unidirectional as illustrated by the solid line 47 in FIG. 2. However, in another embodiment, communication between the hypervisor 46 and blending and arbitration module 50 is bi-directional as shown by the dotted line 49 in FIG. 2. For example, if the next VM 40 requires power state change, the switch between VMs 40 can take some time. Therefore, the blending and arbitration module 50 may send an acknowledge signal (ACK) to the hypervisor 46 when the power state change is complete and next VM 40 can proceed. In another example, when a new VM 40 starts or when an existing VM 40 requests are changed, the blending and arbitration module 50 may detect that the underlying physical machine cannot meet the demands of all of the VMs 40. After receiving this status, the hypervisor 46 might then take corrective action, for example, on a server farm it might attempt to migrate one of the VMs 40 to another physical server.

Hypervisor interface module 60 is coupled to memory 26 and to a virtual machine message processor 62. Virtual machine message processor 62 receives inputs from the plurality of virtual machine graphics drivers 42 and from the hypervisor interface module 60. Either hypervisor interface module 60 or virtual machine message processor 62 may store the virtual machine power control setting requests received from the hypervisor 46 or drivers 42 in locations 52 of memory 26.

The blending and arbitration module 50 further includes a blender/arbiter 64 which receives messages from the virtual machine message processor 62 and/or hypervisor interface module 60 related to the identification of the VMs 40. As discussed in detail below, the blender/arbiter 64 processes the virtual machine power control setting requests along with the unique identifier for active virtual machines and time slice data to determine the overall power control requests for use by the power management unit 24 of the graphics processing core 12. The blender/arbiter 64 stores the determined power control requests at location 54 of memory 26.

The power management unit 24 of graphics processing core 12 may use ACPI (Advanced Configuration and Power Interface) specifications for power management and thermal management of the graphics processing core 12. ACPI is an open industry specification which establishes industry-standard interfaces enabling operating system directed configuration, power management, and thermal management of integrated circuit devices.

The hypervisor interface module 60 stores virtual machine specific data in the power management memory 26. Specifically, the hypervisor interface module 60 stores the VM power control setting requests in an appropriate data structure associated with the unique identifier of each virtual machine. In illustrated embodiments, the VM power control setting requests include operating ranges (minimum and maximum) for each power rail of the graphics processing core 12. In addition, special control flags may tell the power management unit 24 what internal engines have to be powered on, what watermark level to use, and what display channels are used, for example.

Data that virtual machine graphics drivers 42 normally provide to the power management unit 24 are stored for each of the plurality of VMs 40 at locations 52 in memory 26. The blending and arbitration module 50 processes analyses the plurality of virtual machine power setting requests stored at locations 52 and determines a power control request for the power management unit 24 based on a blending operating and/or an arbitration operation depending upon the VM application(s) that is (are) running. In other words, the blending and arbitration module 50 may blend all power control setting requests or it may select the power control setting request for a particular VM 40 to use as the power control request for a predetermined amount of time. The power management requirements determined by the blending and arbitration module 50 are a set of conditions that control the power management unit 24 once all the specific virtual machine requirements have been taken into consideration. For blended power management requirements, the ranges for clock frequency domains for the plurality of virtual machines are considered. A blended clock range is provided for the frequency domain and a blended voltage range is provided for the voltage domain.

Figure 4:
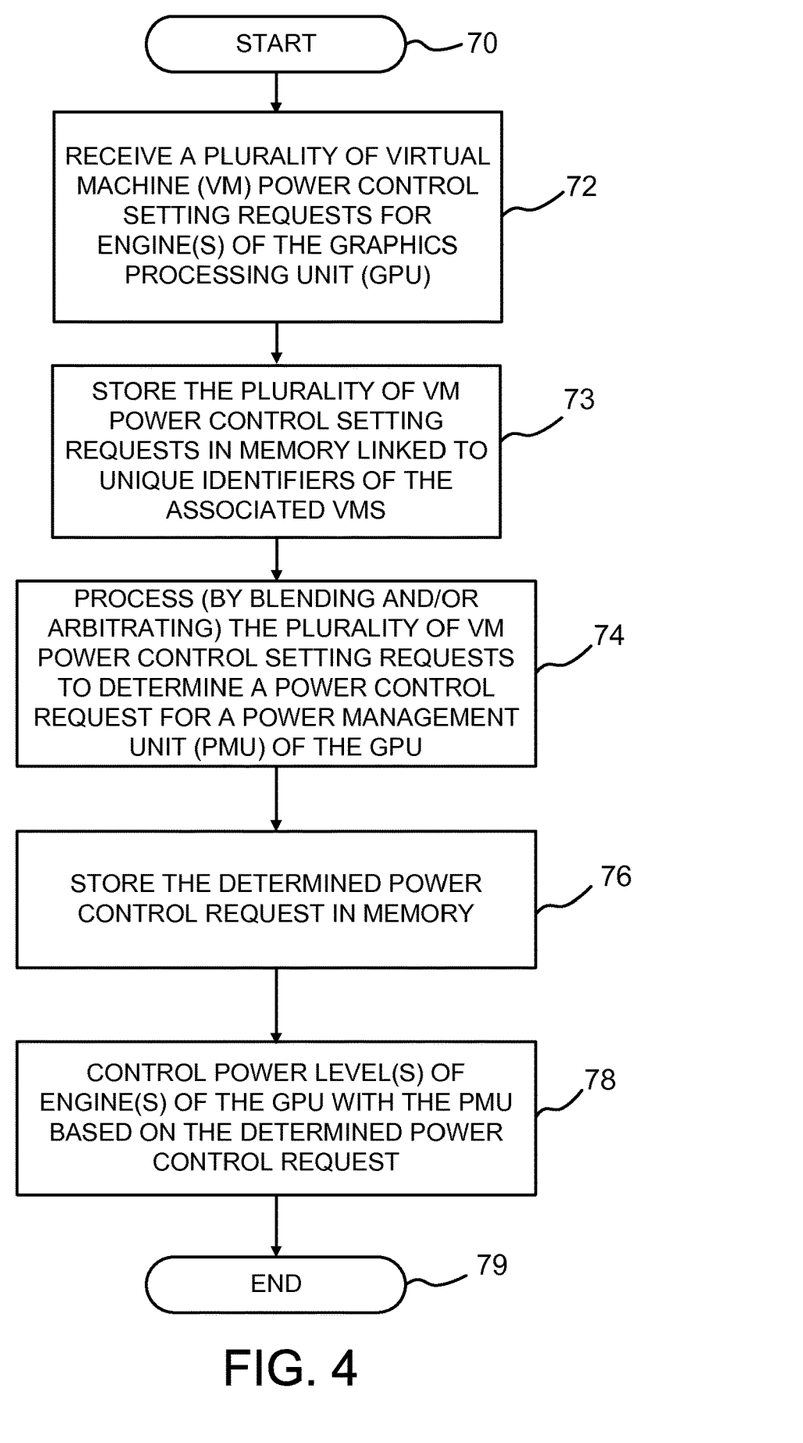
FIG. 4 is a flowchart illustrating an exemplary method for controlling engines of a graphics processing core based on the power control request determined by the blending and arbitration module.
Figure 5:
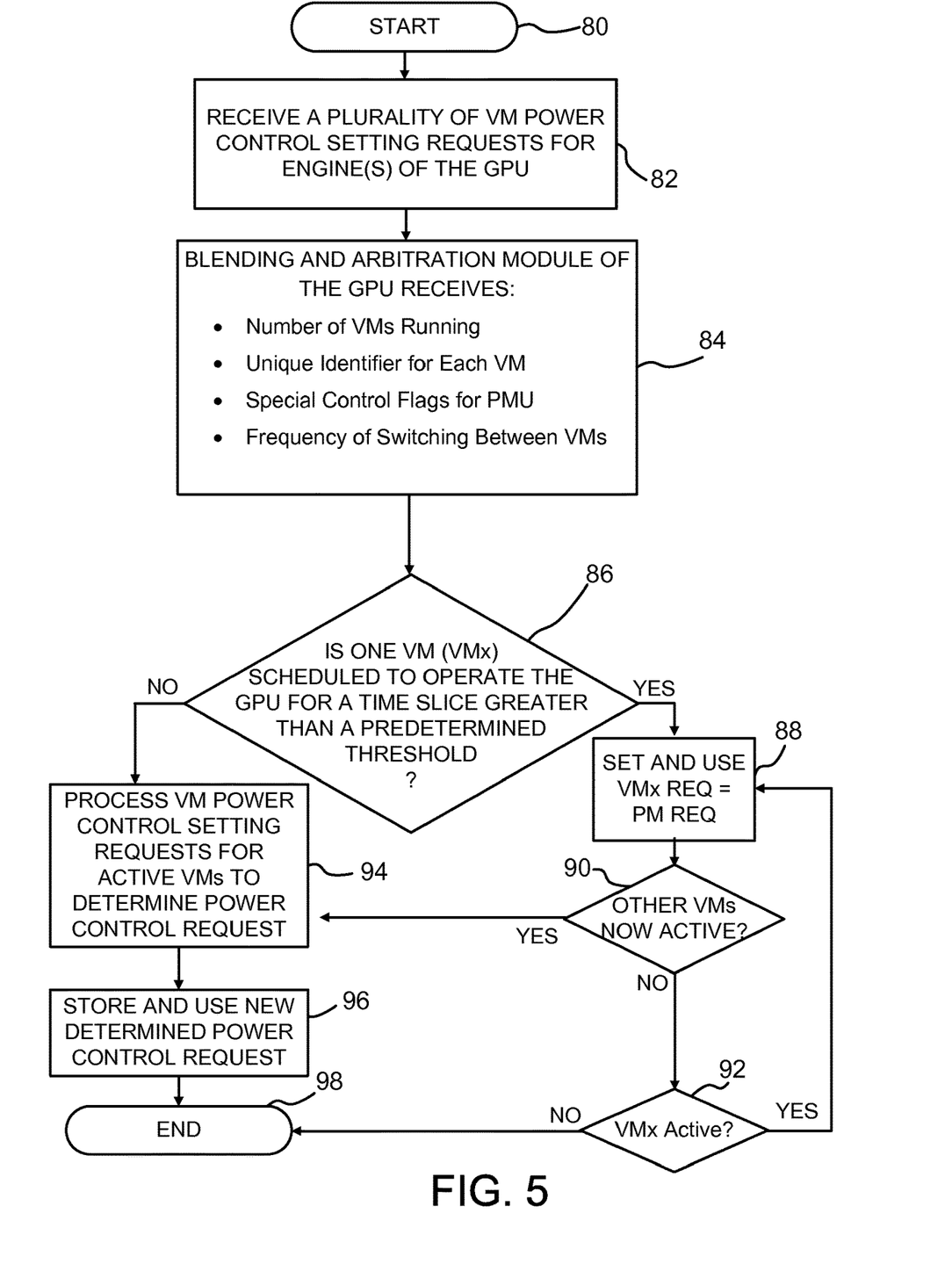
FIG. 5 is a flowchart illustrating further details of an exemplary method for controlling engines of the graphics processing core based on the power control request determined by the blending and arbitration module.

Requirements considered by the blending and arbitration module 50 may differ depending upon whether real time processing or non-real time processing is required. In the non-real time clock domain, requests are not immediate. For example, word processing programs or certain video games may be operated in the non-real time clock domain. For real time processing, processing is required to be completed within a certain time period to avoid degrading quality such as, for example, multi-media audio and video where dropping a frame is not acceptable. Details of operation of an exemplary embodiment of the blending and arbitration module 50 are shown in FIGS. 4 and 5. As shown in FIG. 4, the method starts at block 70. The blending and arbitration module 50 receives a plurality of virtual machine power control setting requests from the hypervisor 46 and/or graphics driver(s) 42 as illustrated at block 72. Blending and arbitration module 50 then stores the plurality of VM power control setting requests in locations 52 of memory 26 linked to unique identifiers of the VMs 40 as illustrated at block 73. Blending and arbitration module 50 next processes the VM power requests to determine a power control request for the power management unit 24 as illustrated at block 74. The blending and arbitration module 50 then stores the determined power control request (PM REQ) in location 54 of memory 26 as illustrated at block 76. The power control requests include Min and Max levels for relevant clock frequencies and on/off states for specific engines, for example.

Power management unit 24 then controls power levels of the graphics processing core 12, including frequencies and voltages supplied to graphics engine 14, display engine 16, encoding engine 18, and decoding engine 20, using the stored power control request as illustrated at block 78. It is understood that the engines 14, 16, 18 and 20 of graphics processing core 12 are separately controllable and different engines may share operating frequencies or have independent operating frequencies depending upon the particular applications of the VMs 40. The process of FIG. 4 ends at block 79.

Additional details of operation of the blending and arbitration module 50 are shown in FIG. 5. The operation starts at block 80. As discussed above, the blending and arbitration module 50 receives a plurality of virtual machine power control setting requests from the hypervisor 46 or graphics drivers 42 as illustrated at block 82. In addition, the blending and arbitration module 50 receives information from the hypervisor 46 regarding the number of VMs 40 that are running, a unique identifier for each VM 40, special control flags for the power management unit 24, and information related to the frequency of switching between the plurality of VMs 40 as illustrated at block 84.

The blender/arbiter 64 of blending and arbitration module 50 determines whether one particular VM (illustratively VMx) is operating for a time slice greater than a predetermined threshold time period as illustrated at block 86. If so, the blender/arbiter uses the power control setting requests for the virtual machine VMx (VMx REQ) as the power control request (PM REQ) for use by power management unit 24. In other words, the power control setting requests for VMx are stored as the power control request (PM REQ) at location 54 of memory 26 as illustrated at block 88 and used by the power management unit 24 to control the power settings of the graphics processing core 12. This is an example of arbitration.

Next, the blender/arbiter 64 determines whether other VMs 40 are now active as illustrated at block 90. If no other VM 40 is active at block 90, the blender/arbiter 64 determines whether or not VMx is still active at block 92. If VMx is still active at block 92, blender/arbiter 64 returns to block 88 and maintains the same power control request. If the VMx is not active at block 92, the process ends at block 98.

If at least one other VM 40 is now active at block 90, the blender/arbiter 64 processes the power control setting requests from the active VMs 40 to determine a new power control request (PM REQ) as illustrated at block 94. The blender/arbiter 64 stores the new determined power control requests at location 54 of memory 26, and the new determined power control requests used by the power management unit 24 to control the power settings of the graphics processing core 12 as illustrated at block 96. The process ends at block 98.

Illustrative examples of the operation of blending and arbitration module 50 are set forth below. These examples are for illustrative purposes only and not meant to be exclusive or exhaustive.

Example One

Blending

Default graphics engine frequency range: 100 MHz to 900 MHz
Default memory frequency range: 150 MHz to 1200 MHz
Assume that VM1 plays video. The video decoding engine 20 requires a graphics frequency of at least 300 MHz and memory frequency of at least 300 MHz. Plus, since both graphics engine 14 and decoding engines 20 are both active, the graphics frequency should not exceed 800 MHz to avoid overheating. Therefore, VM1 has a graphics engine frequency range of 300 MHz to 800 MHz, and VM1 has a memory frequency range of 300 MHz to 1200 MHz.
Assume VM2 uses 4 displays. To support necessary display bandwidth, VM2 requires a graphics frequency at least 250

MHz and memory frequency at least 400 MHz. Therefore, VM2 has a graphics engine frequency range of 250 MHz to 900 MHz and a memory frequency range of 400 MHz to 1200 MHz.

Blended operating ranges determined by the blending and arbitration module 50 are:

Graphics engine frequency range: 300 MHz to 800 MHz
Memory frequency range: 400 MHz to 1200 MHz If the time slice for VM2 is large enough (greater than a predetermined threshold), the decoding engine 20 can be power gated while VM1 is inactive and VM2 is running. Then VM1 state request can be ignored during VM1 inactivity and the effective operating range will be:

Graphics engine frequency range: 250 MHz to 900 MHz
Memory frequency range: 400 MHz to 1200 MHz When VM1 becomes active, the operating range changes back to the blended ranges referenced above.

Example Two

Arbitration

Assume that VM1 starts a trans-coding task. Its driver issues a request to Power Management Unit (PMU) 24 to power up decoding engine 20 and encoding engine 18. Since both the decoding engine 20 and the encoding engine 18 are off, the power management unit 24 powers them up.

Assume that VM2 starts video playback. Its driver 42 issues a request to power management unit 24 to power up the decoding engine 20. Since the decoding engine 20 was already on, power management unit 24 does nothing.

VM1 finishes its task. VM1's driver 42 then issues a request to power management unit 24 to power down decoding engine 20 and the encoding engine 18. Since the encoding engine 18 is not needed, power management unit 24 powers it off. However the decoding engine 20 is in use by VM2 and stays powered on.

For real time workloads, some clock domains may be treated as the effective VM minimum. For example, assume there are four VMs 40 and these VMs 40 request minimum frequencies of 100 MHz, 200 MHz, 150 MHz, and 200 MHz for a clock domain for which there is a real time dependency. If the 100 MHz minimum is tagged as real time requirement, and the associated VM 40 is only running 25% of the time, then the blender may choose 400 MHz to meet the VMs 40 real time requirement.

Therefore, as discussed above, the present method and apparatus advantageously determines appropriate operating ranges for various engines of the graphics processing core to satisfy the requirements of the multiple virtual machines using the graphics processing core on a much finer-grain level than conventional systems.

The above detailed description of the invention and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. A method comprising:
receiving a plurality of virtual machine power control setting requests for a plurality of virtual machines, each virtual machine power control setting request including a range of operating frequencies of a graphics processing core and having a different minimum operating frequency and wherein each of the range of operating frequencies is suitable for operating a respective one of the plurality of virtual machines;
determining that a time slice, which defines a time duration when each of the plurality of virtual machines is scheduled to be in operation, is greater than a predetermined threshold time length;
in response to the time slice being greater than the predetermined threshold for one of the plurality of virtual machines, selecting a received virtual machine power control setting request corresponding to the one of the plurality of virtual machines as a determined power control request for a power management unit of the graphics processing core; and
controlling power levels of the graphics processing core with the power management unit based on the selected power control request.

2. The method of claim 1, wherein the determined power control request also controls turning at least one engine of the graphics processing core on and off.

3. The method of claim 1, wherein the power management unit uses the determined power control request to control power levels of at least one of: a graphics engine, a display engine, a decoding engine and an encoding engine of the graphics processing core.

4. The method of claim 1, wherein processing a plurality of virtual machine power control setting requests to determine a power control request comprises comparing the plurality of virtual machine power control setting requests and selecting the power control request for the power management unit based on the comparison.

5. The method of claim 1, further comprising storing the plurality of virtual machine power control setting requests and the determined power control request in a memory electrically coupled to the power management unit.

6. The method of claim 5, wherein the stored plurality of virtual machine power control setting requests are linked to a unique identifier of an associated virtual machine.

7. The method of claim 1 comprising in response to the time slice being less than the predetermined threshold, blending the plurality of virtual machine power control setting requests together to determine the determined power control request for the power management unit.

8. A method comprising:
receiving a unique identifier for each of a plurality of virtual machines having access to a graphics processing core;
receiving a virtual machine power control setting request for a power management unit of the graphics processing core for each of the plurality of virtual machines, wherein each of the plurality of virtual machine power control setting requests includes a determined range of operating frequencies of the graphics processing core, each range having a different minimum operating frequency and wherein each of the determined range of operating frequencies is suitable for operating a respective one of the plurality of virtual machines;
storing the plurality of virtual machine power control setting requests in a memory electrically coupled to the power management unit, the stored virtual machine power control setting requests being linked to the unique identifier of an associated virtual machine;
determining which of the plurality of virtual machines are actively using the graphics processing core during a predetermined time period;
selecting one of the plurality of virtual machine power control setting requests, the virtual machine power control setting requests linked to the unique identifiers of the active virtual machines, as a determined power control request for the power management unit of the graphics processing core, the selecting being based on determining that a time slice, which defines a time duration when each of the plurality of virtual machines is scheduled to be in operation, is greater than a predetermined threshold time length; and controlling power levels of at least one engine of the graphics processing core with the power management unit based on the determined power control request.

9. The method of claim 8 further comprising determining that the time slice is less than the predetermined threshold and in response to determining that the time slice is less than the predetermined threshold, blending the plurality of virtual machine power control setting requests together to determine the power control request for a power management unit.

10. An apparatus comprising:
a graphics processing core operative to host a plurality of virtual machines;
a power management unit configured to control power levels of a plurality of engines of the graphics processing core based on a power control request; and
a blending and arbitration module in operative communication with the power management unit, the blending and arbitration module being operable to process a plurality of virtual machine power control setting requests corresponding to the plurality of virtual machines, each including a range of operating frequencies of the graphics processing core having a different minimum operating frequency and wherein each of the range of operating frequencies is suitable for operating a respective one of the plurality of virtual machines, to determine the power control request for use by the power management unit by:
  determining that a time slice, which defines a time duration when each of the plurality of virtual machines is scheduled to be in operation, is greater than a predetermined threshold time length; and
  in response to determining that the time slice is greater than the predetermined threshold for one of the plurality of virtual machines, selecting a virtual machine power control setting requests corresponding to the selected one of the plurality of virtual machines as the power control request for the power management unit.

11. The apparatus of claim 10, further comprising a display in operative communication with the graphics processing core to display image data generated by the graphics processing core.

12. The apparatus of claim 10 wherein the blending and arbitration module is operative to, in response to determining that the time slice is less than the predetermined threshold, blend the plurality of virtual machine power control setting requests together to determine the determined power control request for the power management unit.

13. A non-transitory computer readable storage medium comprising executable instructions that when executed by at least one processor causes the at least one processor to:
process a plurality of virtual machine power control setting requests, each including a range of operating frequencies of a graphics processing core and having a different minimum operating frequency and wherein each of the range of operating frequencies is suitable for operating a respective one of a plurality of virtual machines, to determine a power control request for a graphics processing core by selecting a power control setting request from one of the plurality of virtual machines as a determined power control request for the graphics processing core, the selecting being based on determining that a time slice, which defines a time duration when each one of the virtual machines is scheduled to be in operation to use the graphics processing core, is greater than a predetermined threshold time length; and
adjust power levels of the graphics processing core based on the determined power control request.

14. The storage medium of claim 13 comprising executable instructions that when executed by at least one processor causes the at least one processor to in response to determining that the time slice is less than the predetermined threshold, blend the plurality of virtual machine power control setting requests together to determine the power control request for a power management unit.

* * * * *